(12) United States Patent
Choi et al.

(10) Patent No.: US 11,679,687 B2
(45) Date of Patent: Jun. 20, 2023

(54) SYSTEM AND METHOD FOR ELECTRICAL VEHICLE CHARGING SYSTEM

(71) Applicant: ABB Schweiz AG, Baden (CH)

(72) Inventors: Sangeun Choi, Simsbury, CT (US); William J. Eakins, Coventry, CT (US); Gregory A. Cole, West Hartford, CT (US); Martin Krucinski, Glastonbury, CT (US); Thomas A. Fuhlbrigge, Ellington, CT (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/174,444

(22) Filed: Feb. 12, 2021

(65) Prior Publication Data
US 2021/0167609 A1 Jun. 3, 2021

Related U.S. Application Data

(62) Division of application No. 16/182,115, filed on Nov. 6, 2018, now Pat. No. 10,951,044.

(51) Int. Cl.
B60L 53/16 (2019.01)
H01R 13/52 (2006.01)
B08B 1/00 (2006.01)
H02J 7/00 (2006.01)
B08B 9/00 (2006.01)

(52) U.S. Cl.
CPC ............. B60L 53/16 (2019.02); B08B 1/002 (2013.01); H01R 13/5202 (2013.01); H02J 7/0013 (2013.01); B08B 9/00 (2013.01); B08B 2209/00 (2013.01)

(58) Field of Classification Search
CPC ......... B08B 17/02; B08B 17/04; B60L 53/16; B60L 53/30; B60L 53/35; B60L 53/36; H02J 7/007
See application file for complete search history.

(56) References Cited

U.S. PATENT DOCUMENTS 9,446,676 B2 9/2016 Reinschke
2011/0256737 A1 10/2011 Lacour
2012/0266914 A1 10/2012 Van Dyke et al.
(Continued)

FOREIGN PATENT DOCUMENTS

CN 106926727 A * 7/2017 .......... B60L 11/1825
DE 102016008982 A1 * 2/2017
(Continued)

OTHER PUBLICATIONS

European Patent Office, International Search Report in International Patent Application No. PCT/IB2019/059514, 8 pp. (dated Apr. 6, 2020).
(Continued)

Primary Examiner — Natasha N Campbell
(74) Attorney, Agent, or Firm — Leydig, Voit & Mayer, Ltd.

(57) ABSTRACT

A protective arrangement for an electric vehicle charging system includes a floor unit forming a recess and a linkage disposed in the recess. The linkage is extendable from the recess from a stowed position to an extended position. A cleaning device is disposed to discourage accumulation of debris into the recess and on the linkage when the linkage is in the stowed position.

13 Claims, 13 Drawing Sheets

(56) References Cited

U.S. PATENT DOCUMENTS

2013/0307477 A1   11/2013  Reinschke
2018/0001777 A1    1/2018  Kilic

FOREIGN PATENT DOCUMENTS

DE    102016008982 A1   2/2017
DE    102017007818 A1   1/2018

OTHER PUBLICATIONS

European Patent Office, Written Opinion in International Patent Application No. PCT/IB2019/059514, 14 pp. (dated Apr. 6, 2020).
U.S. Appl. No. 16/182,115, filed Nov. 6, 2018.

* cited by examiner

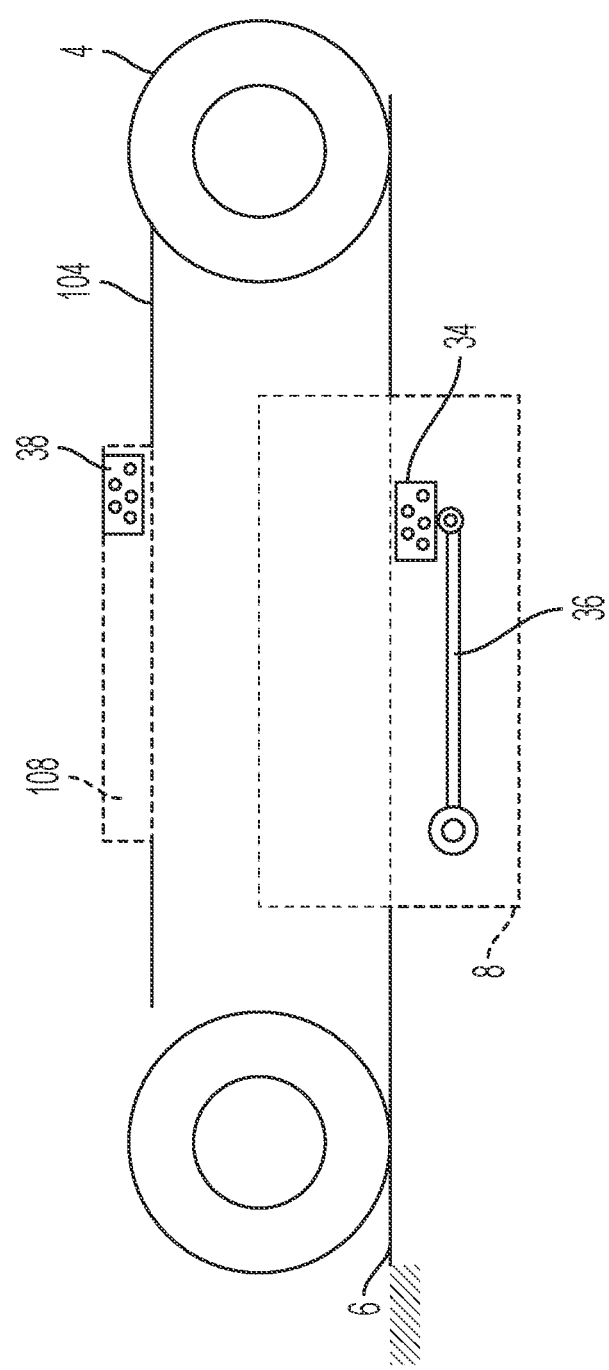

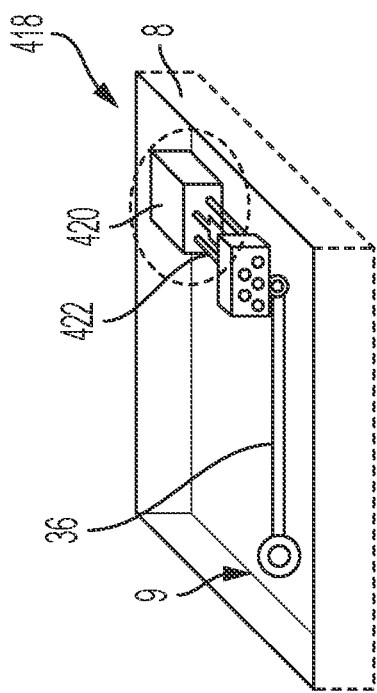
FIG. 12A
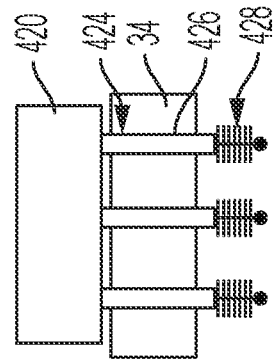
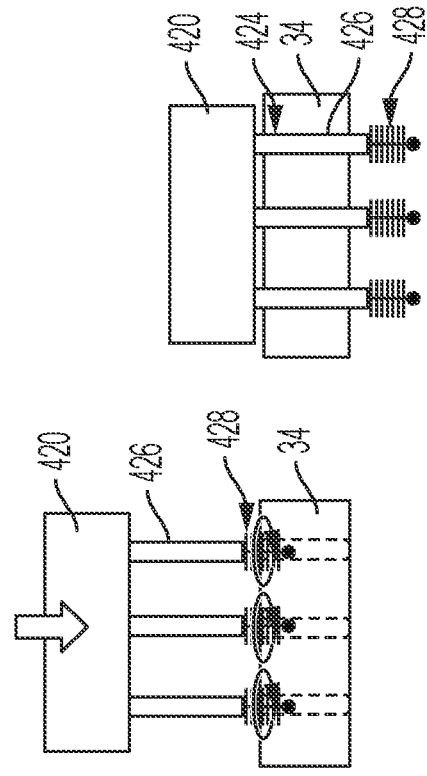
FIG. 12C
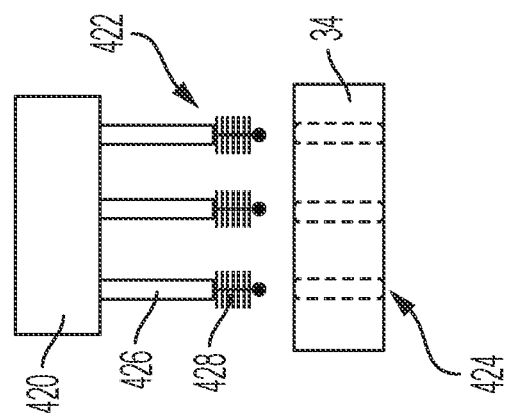
FIG. 12B
FIG. 12D

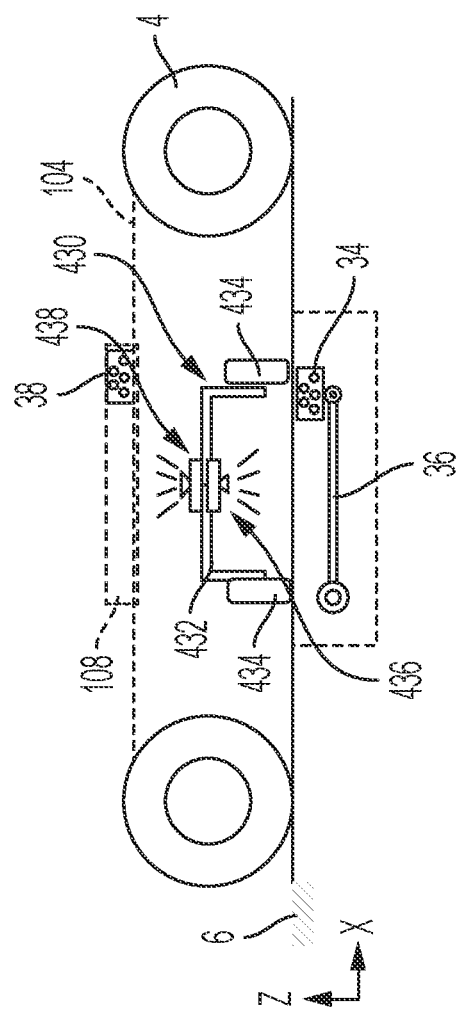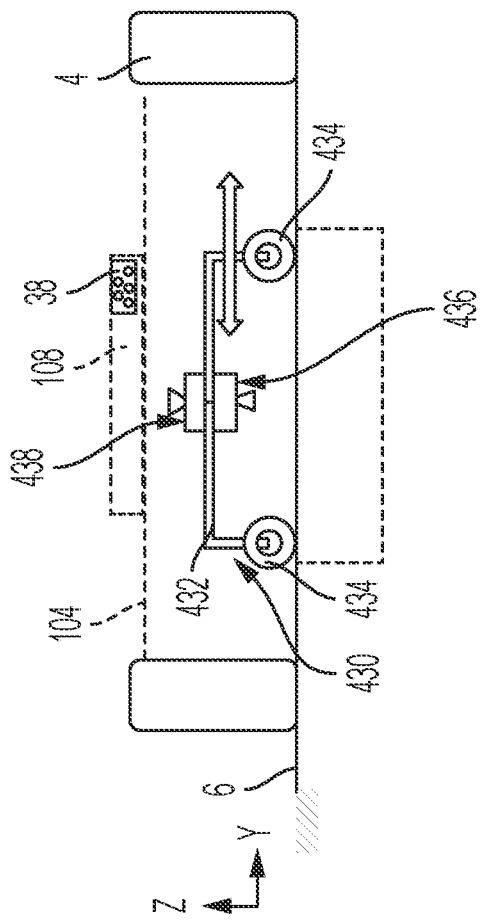
FIG. 13A
FIG. 13B

SYSTEM AND METHOD FOR ELECTRICAL VEHICLE CHARGING SYSTEM

CROSS-REFERENCE TO RELATED APPLICATIONS

This patent application is a divisional of co-pending U.S. patent application Ser. No. 16/182,115, filed on Nov. 6, 2018, the disclosure of which is incorporated herein by reference in its entirety for all purposes.

TECHNICAL FIELD

The present disclosure relates to charging systems and methods for electric vehicles and, more particularly, to a cleaning system and method and/or a system and method for protecting against debris accumulation in a charging arrangement for an electric vehicle.

BACKGROUND

Use of electrical vehicles is becoming increasingly popular due to the environmental benefits of removing pollution caused by fossil fuel burning vehicle engines from the environment, especially in densely populated urban environments. As with most mobile electrical devices, electrical vehicles carry electrical power storage devices or batteries, which provide power to the vehicle propulsion and other systems. As can be appreciated, the vehicle batteries require periodic recharging to provide consistent vehicle operation.

At present, electric vehicle recharging is accomplished by connecting a charging connector into a vehicle receptacle manually. The vehicle receptacle is usually located in the same or similar location as a vehicle fuel fill spout for ease of use. Such locations are protected by doors or lids, much in the same way vehicle fill spouts are protected from environmental elements, dirt and road debris. However, with the advent of automated electric vehicle recharging systems, the vehicle charge receptacles may be located elsewhere in the vehicle, including areas that are commonly inaccessible to users such as beneath the vehicle, on the sides of the vehicle, and/or in the front or rear portions of the vehicle. Such positions may expose the receptacles to damage, debris, ice, snow and other environmental factors commonly found in on- and off-highway vehicle operating environments. The presence of debris, water, ice, snow, dirt and the like may interfere with establishing a proper electrical connection to charge the vehicle.

SUMMARY OF THE DISCLOSURE

In one aspect, the disclosure describes a protective arrangement for an electric vehicle charging system. The protective arrangement includes a floor unit forming a recess, a linkage disposed in the recess, the linkage being extendable from the recess from a stowed position to an extended position, and a cleaning device disposed to discourage accumulation of debris into the recess and on the linkage when the linkage is in the stowed position.

In another aspect, the disclosure describes a method for protecting a charging arrangement for an electric vehicle. The method includes providing a floor unit forming a recess, providing a linkage disposed in the recess, the linkage being extendable from the recess from a stowed position to an extended position, and providing a cleaning device disposed to discourage accumulation of debris within the recess and onto the linkage when the linkage is in the stowed position.

In yet another aspect, the disclosure describes a protective arrangement for an electric vehicle charging system. The arrangement includes a floor unit forming a recess, a vehicle unit having a slide surface, a linkage disposed in the recess, the linkage being extendable from the recess from a stowed position to an extended position, and a cleaning device connected to the linkage and configured to discourage accumulation of debris onto the slide surface, wherein the sliding device is arranged to sweep the slide surface under action of the linkage to clean the slide surface.

Further and alternative aspects and features of the disclosed principles will be appreciated from the following detailed description and the accompanying drawings. As will be appreciated, the principles related to systems, methods, and software for the automated cleaning of a vehicle-side charging receptacle disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

FIG. 8 is a schematic of an electric vehicle charging system in accordance with the disclosure.

FIGS. 12A-12D are outline views of another embodiment for a protection and cleaning system for a vehicle charging system in accordance with the disclosure.

FIGS. 13A and 13B are outline views of another embodiment for a cleaning system for a vehicle charging system in accordance with the disclosure.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
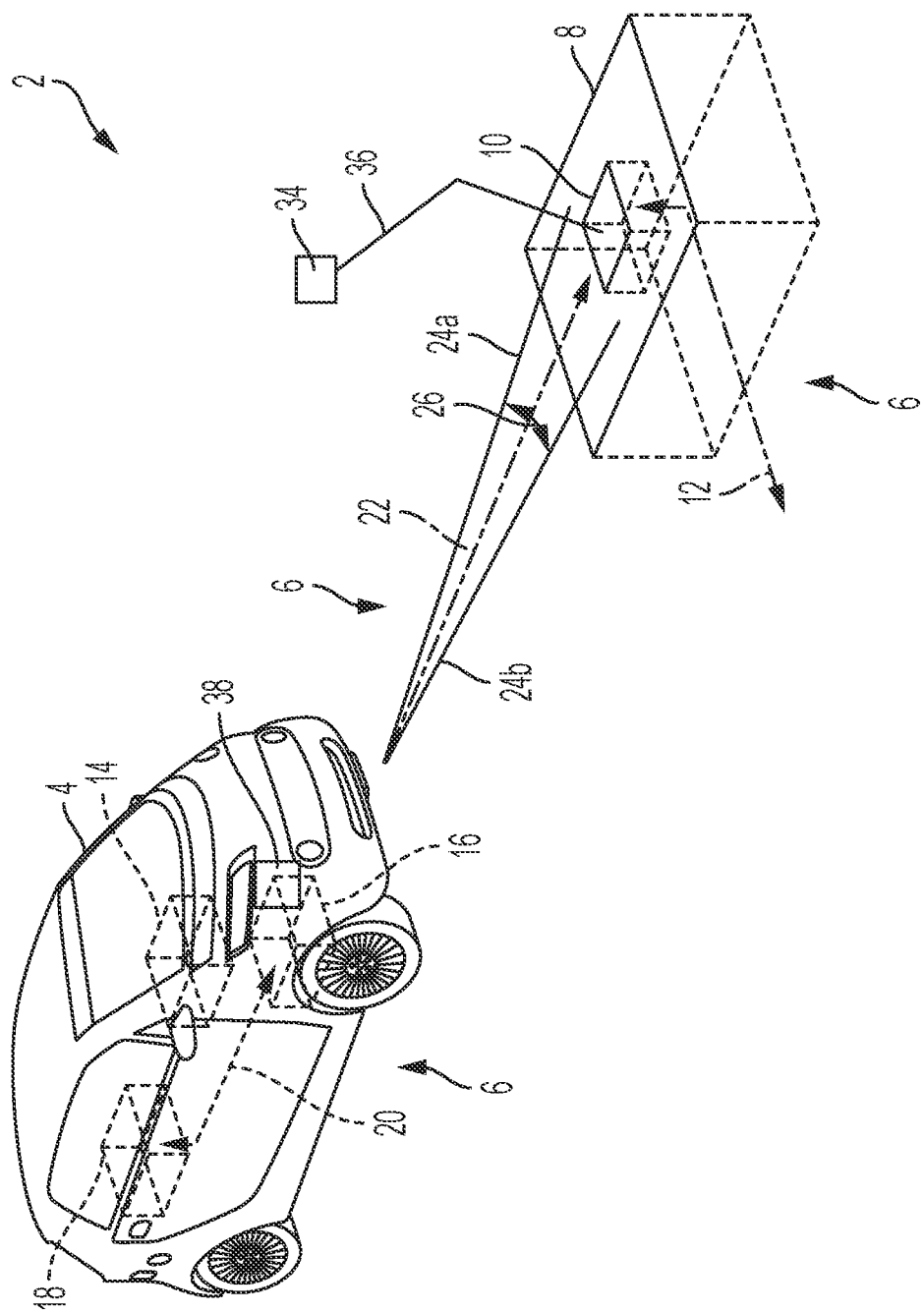
FIG. 1 is a perspective view of an electric vehicle (EV) charging environment according to an embodiment of the disclosure.

FIG. 1 is a perspective view of an electric vehicle (EV) charging environment 2 according to an embodiment of the disclosure. In the example shown in FIG. 1, an EV 4 is positioned on a ground surface 6. EV 4 is a car, as shown in FIG. 1. Alternatively, EV 4 may be a truck, a motorcycle, a moped, a truck or bus, a farm implement or any other on- or off-highway vehicle. In the example shown, ground surface 6 is a floor of a garage of a home or business. Alternatively, ground surface 6 may be a surface of a parking lot. Environment 2 includes a floor unit 8. Floor unit 8 is positioned on or at least in part beneath ground surface 6. Depending on application, and also on the ground clearance of the vehicle, the floor unit 8 may be fully or partially disposed beneath the ground surface, or may alternatively be disposed on the ground surface, for example, when installed on existing floors. Floor unit 8 includes a connector unit 10. At least a portion of connector unit 10 faces and is exposed or exposable to ground surface 6. Floor unit 8 includes a connector unit 10 that is operatively coupled to or associated with an electric power source (e.g., a utility grid, not shown in FIG. 1), either directly or through a transforming or conditioning device such as a transformer. A first electric power flow 12 can thus be selectively enabled between power source and floor unit 8, including to connector unit 10.

EV 4 includes a drivetrain 14 providing motive power to the EV 4 for driving. EV 4 includes a vehicle unit 16 and at least one power storage device such as a battery 18. Battery 18 is operatively coupled to drivetrain 14 for providing electric power thereto to enable providing motive power for EV 4 selectively during operation. Structures and systems of the EV 4 that accomplish the provision of power to the drivetrain 14 selectively by an operator (now shown) of the EV 4 are omitted for simplicity. At least a portion of vehicle unit 16 faces and is exposed or exposable to ground surface 6. It is noted that, while the EV 4 is shown in one orientation as it approaches the floor unit 8, any orientation of approach is also contemplated. Vehicle unit 16 is operatively coupled to battery 18 to provide an interface for providing electrical power to charge the battery 18. A second electric power flow 20 is thus enabled between vehicle unit 16 and battery 18.

In the EV charging environment 2 shown in FIG. 1, EV 4 is being driven and approaches the floor unit 8 including connector unit 10. A driver of EV 4 (e.g., a human driver and/or an autonomous vehicle driving system, not shown in FIG. 1) steers or otherwise controls the EV 4 to floor unit 8 including connector unit 10 along a centerline path 22. As shown in FIG. 1, centerline path 22 extends from EV 4 to at least approximately a center point of connector unit 10 proximal ground surface 6. Based on the particular dimensions and other specifications of EV 4, floor unit 8 including connector unit 10, and/or vehicle unit 16, an approach path of EV 4 to floor unit 8 including connector unit 10 may deviate from the target centerline path 22 by an allowable deviation 24. The allowable deviation may be in any direction, including but not limited to a horizontal or vertical direction. Allowable deviation 24 includes a driver side deviation 24a and a passenger side deviation 24b. An allowable misalignment 26 is defined between lines defining driver side deviation 24a and passenger side deviation 24b. In three dimensions, the misalignment 26 may form a conical area that accounts for height of ground clearance of the vehicle, as well pitch, yaw and roll of the vehicle's trajectory during the approach to the floor unit 8, and also during the connection and charging operations.

Figure 2:
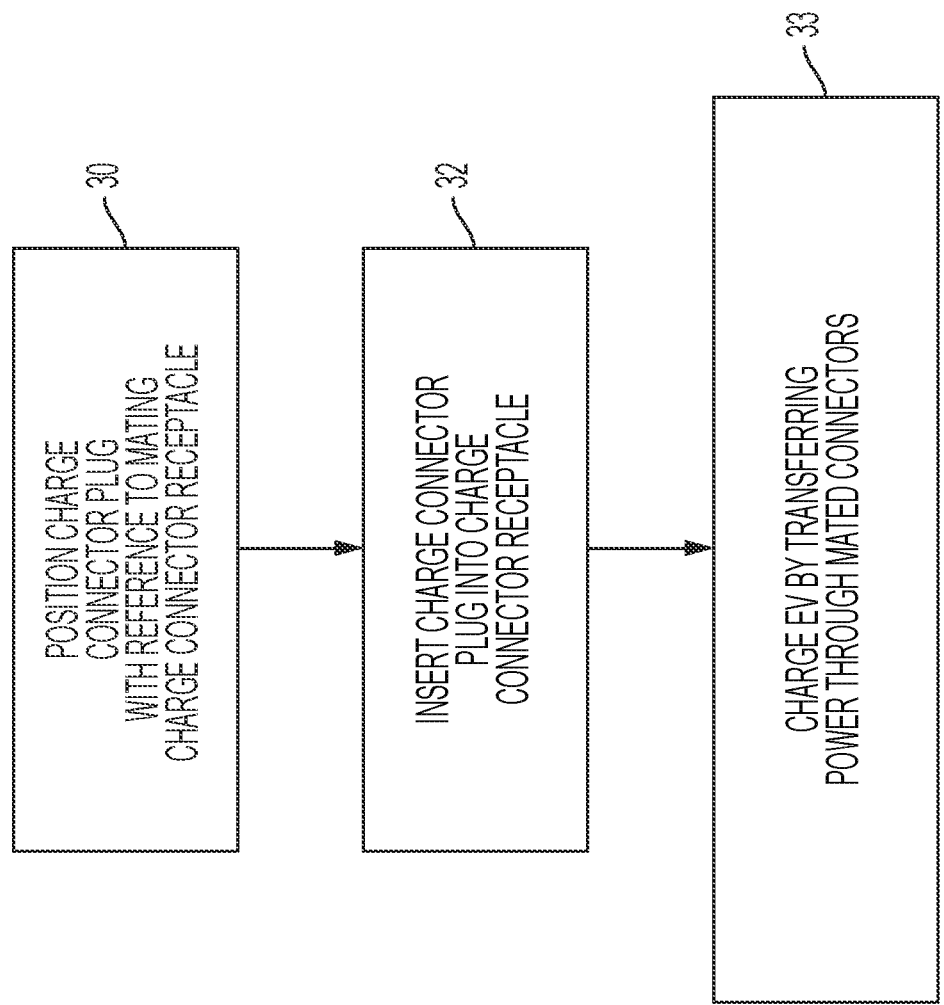
FIG. 2 is a flowchart of a method for underside charging of EVs according to an embodiment of the disclosure.

FIG. 2 is flowchart of a method 28 for underside charging of the EV 4 according to an embodiment of the disclosure. In an example, method 28 is implemented and performed, at least in part, by a mechanical and/or electrical linkage system 36, which rises up from the floor 6 from the connector unit 10 and includes or carries an electrical connector 34. The electrical connector 34 matingly engages a connector 38 associated with the vehicle unit 16 when the EV 4 is stationary over the floor unit 8 for charging.

Referring to FIG. 2, method 28 includes positioning at 30 the connector 34 on the floor unit 8 with reference to connector 38 on the EV 4 using linkage 36. Such placement may be carried out automatically. Method 28 further includes inserting at 32 the connector 34 into connector 38, and initiating a charging process at 33. When the connectors 34 and 38 are mated, a flow of electrical power from the power flow 12 is allowed to be transmitted from the floor unit 8 to the vehicle unit 16, and from there to the battery 18 to charge the battery. A breakable electrical connection between the connectors 34 and 38 is included in this power flow path that charges the battery 18. As can be appreciated, the environment in which the connectors 34 and 38 is harsh because one or both sides of the connectors 34 and 38 are exposed to the environment, road debris, etc. Moreover, the connectors 34 and 38 are advantageously compact to enable or facilitate manual and/or automatic coupling for charging the battery 18.

Figure 3:
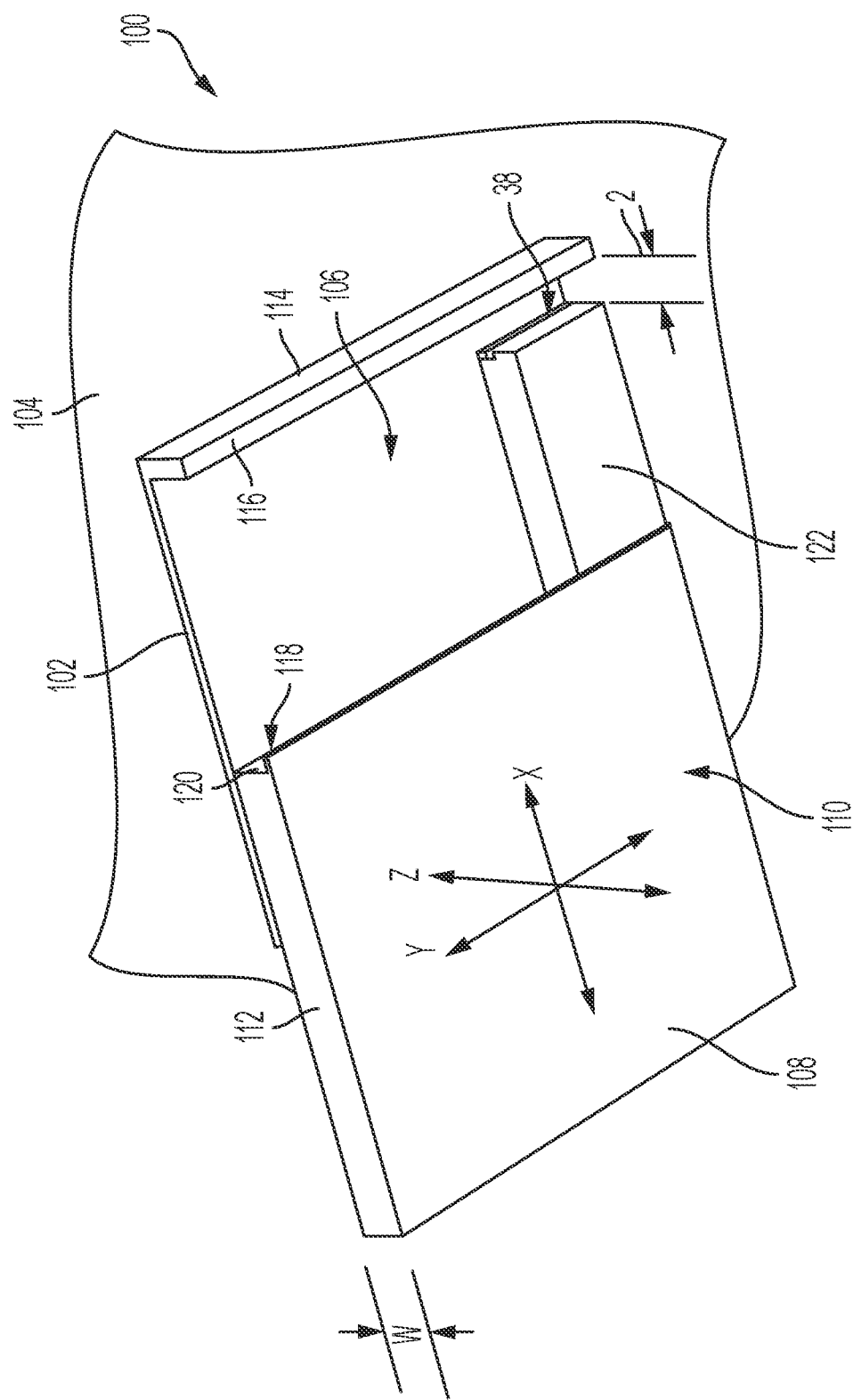
FIG. 3 is a schematic view from a bottom perspective of a vehicle-side charging receptacle in accordance with the disclosure.

One embodiment for an electrical receptacle 100 that is attached to the EV 4, for example, at the vehicle unit 16 (FIG. 1) is shown removed from the vehicle for clarity and from a bottom perspective in FIG. 3. The receptacle 100 includes a base plate 102 that is connected to an undercarriage 104 of the EV 4 (FIG. 1). The base plate 102 in the illustrated embodiment has a generally rectangular shape and presents a slide surface 106 outwardly when the base plate 102 is exposed. A cover 108 has a generally rectangular shape that generally matches the shape of the base plate 102. The cover 108 is slidably disposed over the base plate 102 so that the cover can slide relative to the base plate in an axial direction, X, in two directions from a closed position, in which the cover 108 completely covers the slide surface 106, to an open position, in which the cover 108 has exposed at least a portion of the slide surface 106, as shown in the illustration of FIG. 3. Rails and a linear actuator (not shown) may be disposed between the base plate 102 and cover 108 to selectively move the cover between the closed and open positions. The rails, actuator and/or other components may be housed within the cover 108, which can be hollow in places and define a space between the slide surface 106, an outer shield 110, which is part of and moves with the cover 108, and a sidewall 112. The cover 108 occupies a volume within its footprint in the longitudinal (X) direction and also in a perpendicular or transverse direction (Y), and the vertical direction (Z), which as shown is occupied by the thickness or height, h, of the cover 108, as denoted in FIG. 3.

At one longitudinal end, the base plate 102 includes an end-wall 114, which extends perpendicularly away from the slide surface 106 and has a height that is the same or less than the height h of the cover 108. The end-wall 114 presents an offset surface 116 that is coplanar with the slide surface 106 and the shield 110, and disposed at an offset distance from the slide surface 106. An end face of the cover 108 includes a ledge 118 that overhangs an end-face 120 on a side that faces the end-wall 114 of the base plate 102. One side of the ledge 118 is coplanar with and forms an extension of the shield 110. In this configuration, when the cover 108 is in the closed position, the ledge 118 overlaps and covers the offset surface 116, while the end-face 120 of the cover 108 abuts or is adjacent to a side of the end-wall 114 of the base plate 102.

Disposed on one side and extending in the longitudinal direction, the base plate 102 includes an electronics housing 122 that is attached or is otherwise functionally and/or structurally associated with the vehicle-side connector 38. The electronics housing 122 may include various electronic components that effect transfer and conditioning of electrical power received at the connector 38, and also process information that is exchanged between the EV 4 and the floor unit 8 and/or the connector unit 10, previously described. An open or connection end of the connector 38, which is a side in which a mating connector may be engaged, faces in the longitudinal direction and is disposed at a distance, d, from the end-wall 114. When a mating connector is brought into contact with the connector 38, the mating connector is placed and occupies the space defined by the distance d between and end of the electronics housing 122 and the end-wall 114.

Figure 4:
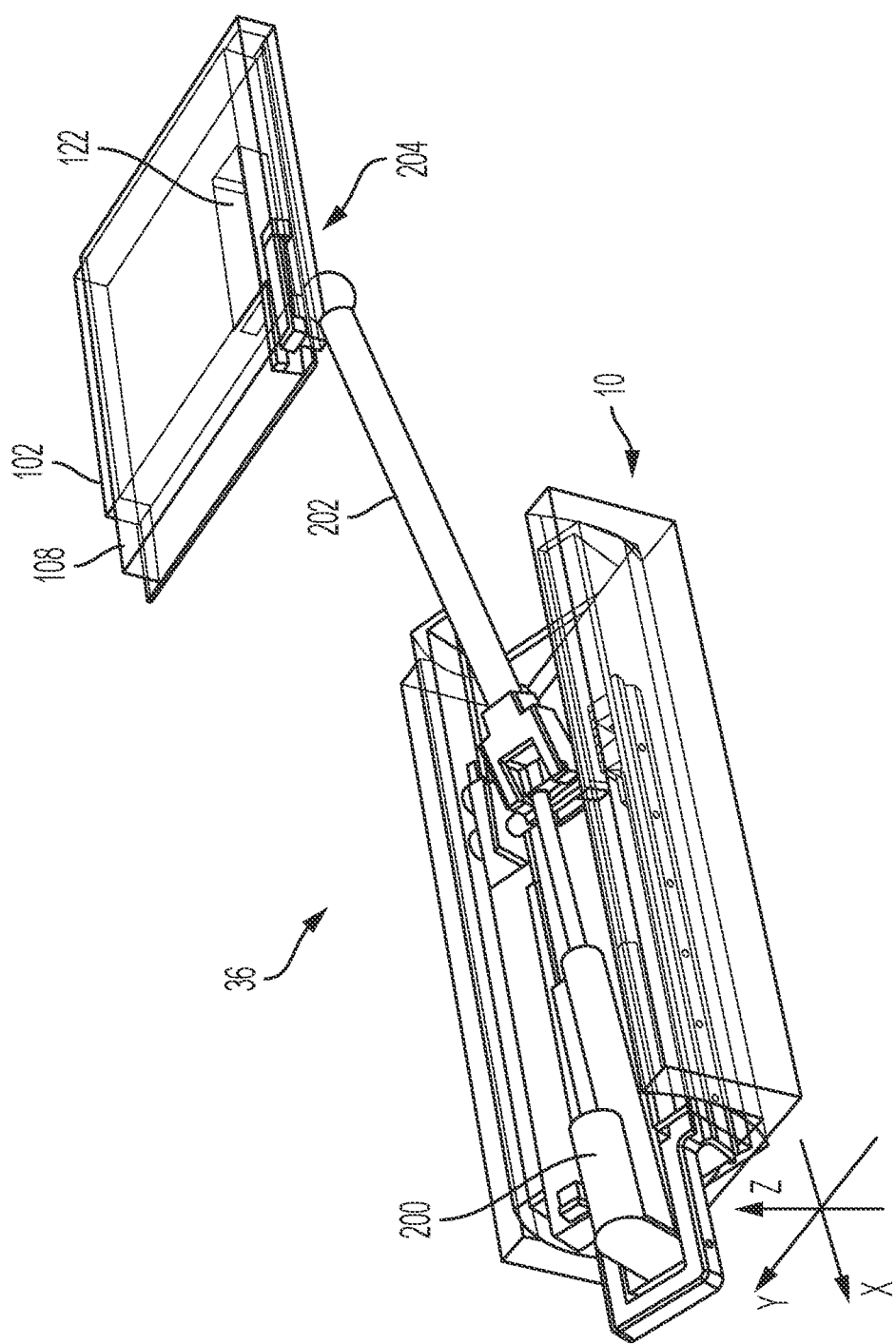
FIGS. 4 and 5 are outline views from different perspectives of a linkage system interacting with the charging receptacle in accordance with the disclosure.
Figure 5:
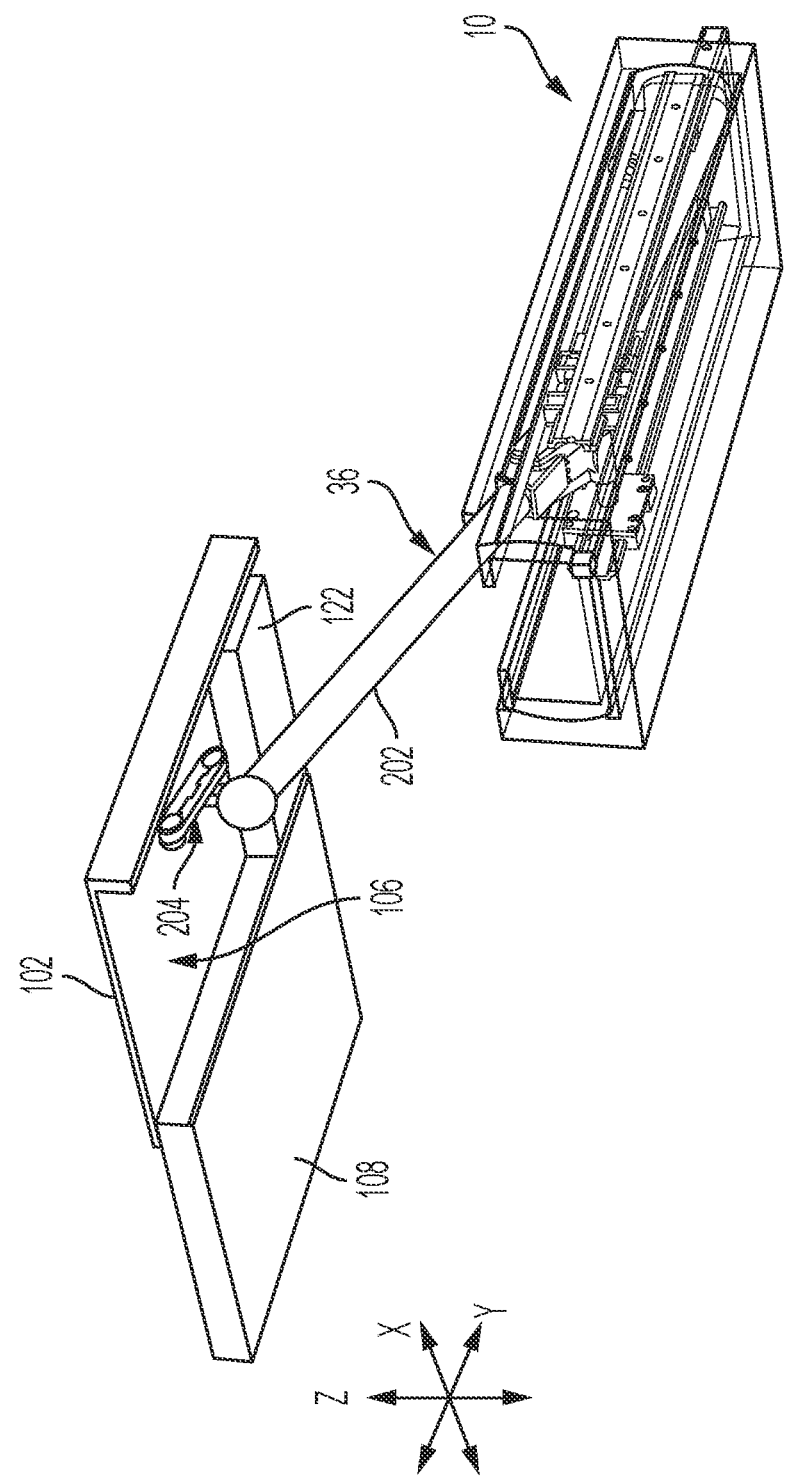

In reference to the charging environment 2 (FIG. 1), the linkage system 36 operating from the connector unit 10. As shown in FIGS. 4 and 5, the linkage system includes one or more actuator(s) 200 operably connected to and causing an arm 202 to move and/or rotate in various directions relative to the X, Y and Z axes. A shuttle 204 is disposed at the end of the arm 202 and is moved thereby and through the action of the actuator(s) 200 to contact and selectively traverse the slide surface 106, as shown in FIG. 5, in any desired direction. In one embodiment, the arm 202 can lift the shuttle 204 and cause it to move transversely relative to the slide surface 106, that is, move the shuttle in the Y and Z directions, while the linear actuator operating the cover 108 may engage the shuttle 204 while it contacts the slide surface 106 push (and/or pull) the shuttle 204 in the X direction while contact with the slide surface 106 is maintained.

During a charging operation, the shuttle 204 may grasp and carry the connector 34 (FIG. 1) to bring the connector 34 in contact with the connector 38 to charge the EV 4. When charging is complete, the shuttle 204 may release the connector 34 and instead carry a cleaning device to sweep or otherwise remove debris from the slide surface 106. As can be appreciated, periodic cleaning of the slide surface 106 and, possibly, other surfaces, is desired and sometimes required to remove road debris, dirt, mud, ice, condensation and any other material that may deposit thereon during operation of the EV 4.

Figure 6:
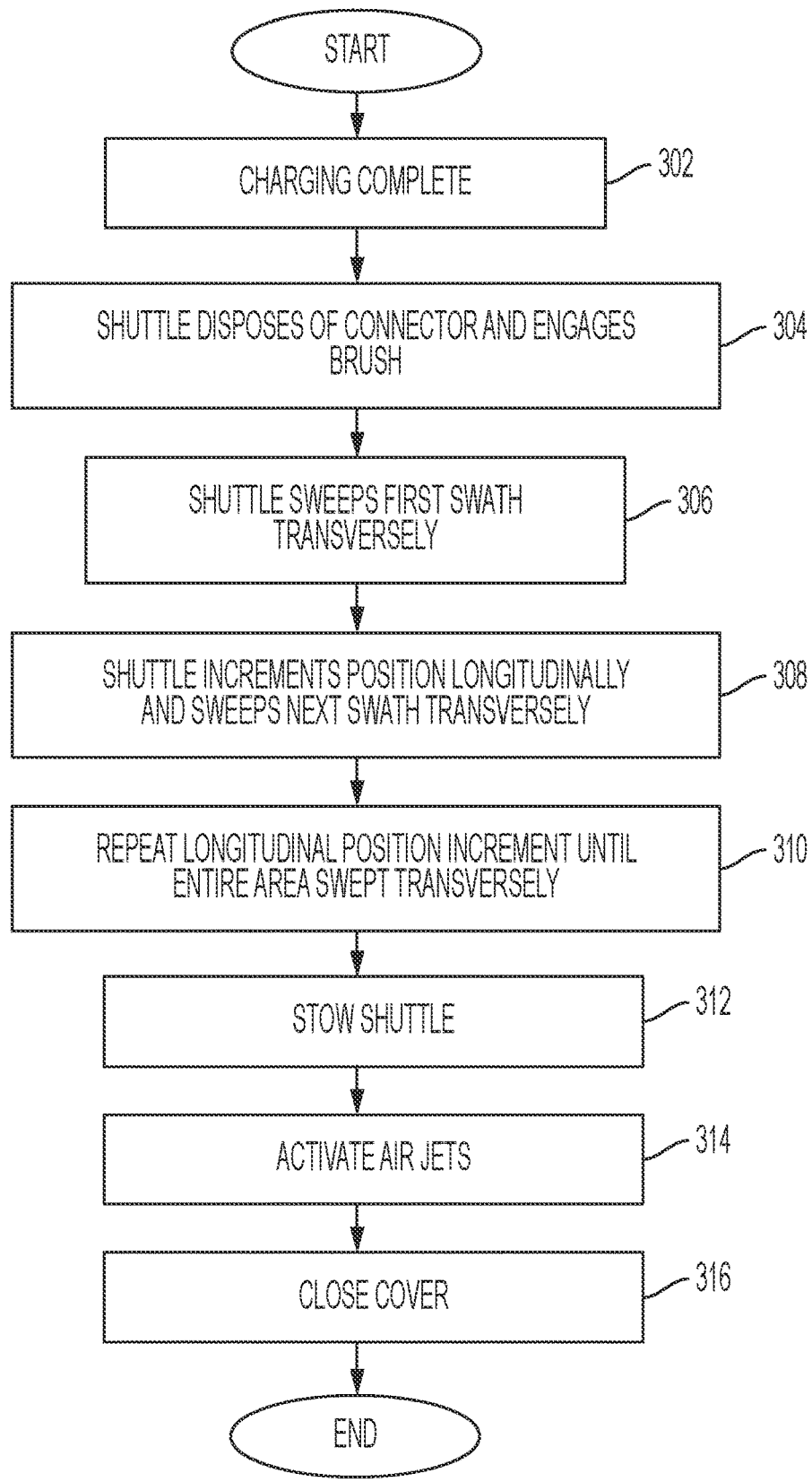
FIG. 6 is a flowchart for one embodiment of a method of cleaning the charging receptacle using the linkage system shown in FIGS. 3-5.
Figure 7A:
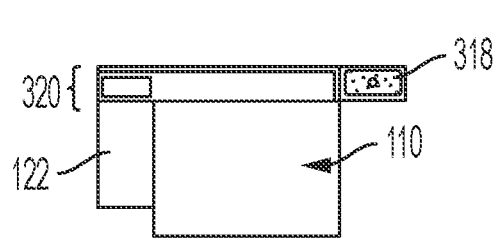
FIGS. 7A-7F are schematic illustrations of various stages of a cleaning process in accordance with the disclosure.

One embodiment for a cleaning operation is described and shown in the flowchart of FIG. 6 and in the schematic representations shown in FIGS. 7A through 7F. In reference to these figures, a method for cleaning a receptacle of the vehicle and, specifically, the slide surface 106 includes determining that a charging process is complete at 302. At completion of the charging process, and in reference to the exemplary embodiment described relative to FIGS. 4 and 5 for illustration, the shuttle 204 may disconnect the connectors 34 and 38, and dispose of the ground-unit side connector 34 and, instead of the connector, engage a cleaning device such as a brush 318 (FIG. 7A). The brush 318 may be carried by the EV 4, as shown in FIG. 7A, or may reside in the floor unit 8.

Figure 7B:
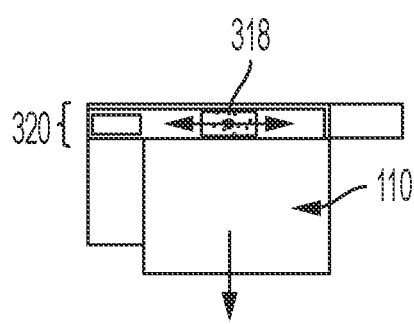
Figure 7C:
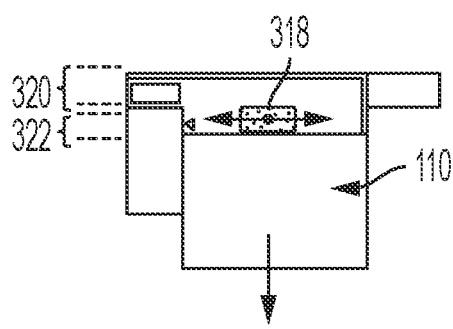
Figure 7D:
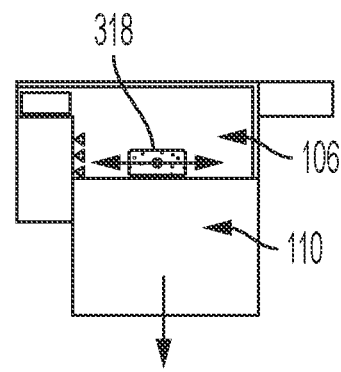
Figure 7E:
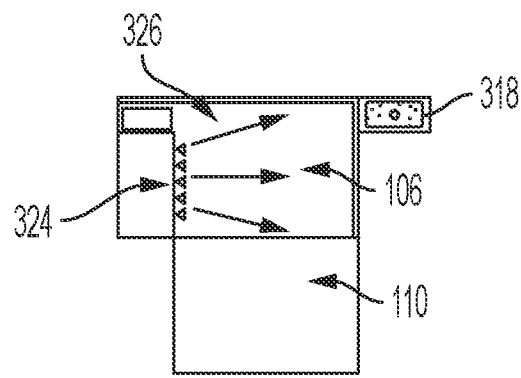
Figure 7F:
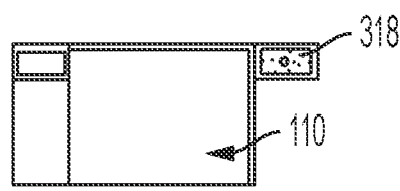

With the brush 318 engaged or otherwise carried by the shuttle 204, a first swath 320 may be swept on the transverse direction at 306 as the arm 202 sweeps the slide surface 106 with the brush 318. The first swath 320 may be swept once or more than once as shown in FIG. 7B. After completion of sweeping of the first swath, the shuttle may increment its longitudinal position to a second swath 322, as shown in FIG. 7C, and sweep the second swath at 308. In the illustrated embodiment, the incremental repositioning of the shuttle 204 may be accomplished by an incremental displacement of the cover 110 onto which the shuttle 204 is sliding, as shown in the figures, but it should be appreciated that the linkage arm 202 may alternatively be configured for motion in two directions and perform all motions described here. The incremental repositioning for sweeping of adjacent swaths along the slide surface 106 with the brush 318 may repeat at 310 until the entire slide surface 106 has been swept. Successive sweeping of adjacent swaths is shown in FIG. 7C for the second swath 322, and in FIG. 7D for a subsequent swath. Upon completion of sweeping, the shuttle 204 is stowed at 312 after redepositing the brush 318 in its holder, and air jets 324 are activated at 314 to provide jets of air 326, as shown in FIG. 7E, to dust off any remaining dirt that was left behind by the sweeping operation. Once clean, the shield 110 returns to its closed position to maintain the slide surface 106 clean and protected until the next charging operation at 316 as shown in FIG. 7F.

Apart from, or in addition to, any cleaning systems that may be used to clean the vehicle-side receptacle, cleaning systems and methods can also be applied to clear or prevent the contamination with debris of the floor unit 8. A schematic view of one possible installation for a charging system that includes a linkage 36 associated with a floor unit 8 is shown in FIG. 8 in a condition when the EV 4 has been parked over the floor unit 8 such that the vehicle unit 16 disposed above the floor unit 8. In this embodiment, it can be seen that the floor unit 8 is sunk into the floor 6 such that the linkage 36 must raise the connector 34 to meet and mate with the vehicle connector 38 for charging. Following a charging operation, the linkage 36 and connector 34 retract back into the floor unit 8 as is the case in the position shown in FIG. 8.

In an arrangement such as the one shown in FIG. 8, the linkage 36, connector 34 and other actuators and components related therewith may be prone to contamination and debris. For example, dirt, water, snow, ice, salt, mud and other contaminants may collect on the linkage 36 and/or the connector 34, which creates the possibility for interference with a charging operation. Various embodiments for cleaning or dirt-removing features, or protection features that avoid debris accumulation, are presented below, which include active or passive cleaning and protection measures and which can be carried out automatically, if desired, following each charging operation or even periodically or as needed.

Figure 9:
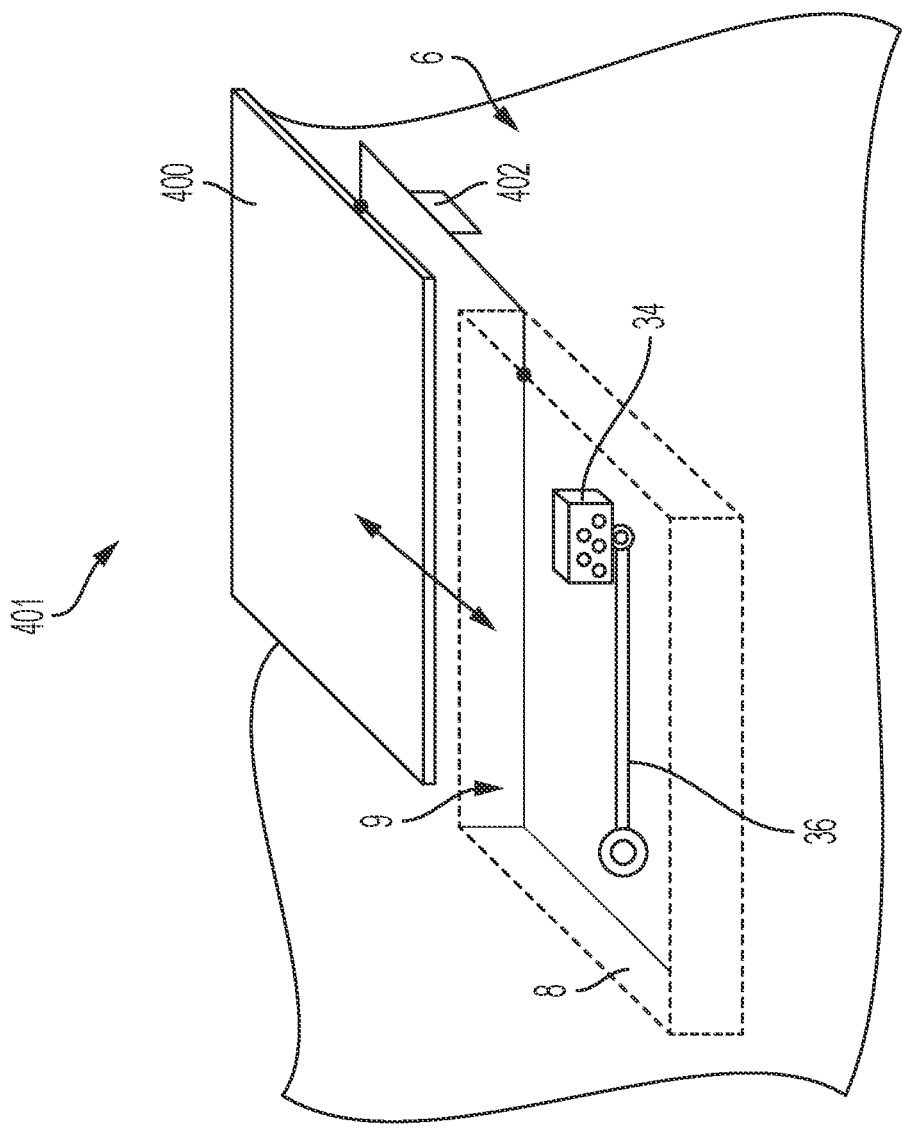
FIG. 9 is an outline view of one embodiment for a protection system against accumulation of debris within portions of a vehicle charging system in accordance with the disclosure.

A first embodiment for a passive protection arrangement 401 is shown in FIG. 9. In this embodiment, the floor unit 8 contains a recess 9 into the floor 6 into which the linkage 36 and connector 34 can be stowed when not deployed to charge a vehicle. A door 400 is slidably disposed relative to the floor and arranged to move, for example, by action of an actuator 402, between a closed position, in which the door 400 covers the recess 9, and an open position, which as shown in FIG. 9 exposes the recess 9 and thus allows the linkage 36 to move the connector 34 out from the recess. Opening and closing of the door by the actuator 402 can occur in response to a signal, which can be provided by a user, for example, by pressing a button positioned on a garage wall, or by a controller associated with the vehicle when the vehicle is positioned and ready to receive a charge. When in the closed position, the door 400 encloses the recess 9 to create a cavity that houses and protects the linkage 36 and connector 34 from contamination.

Figure 10B:
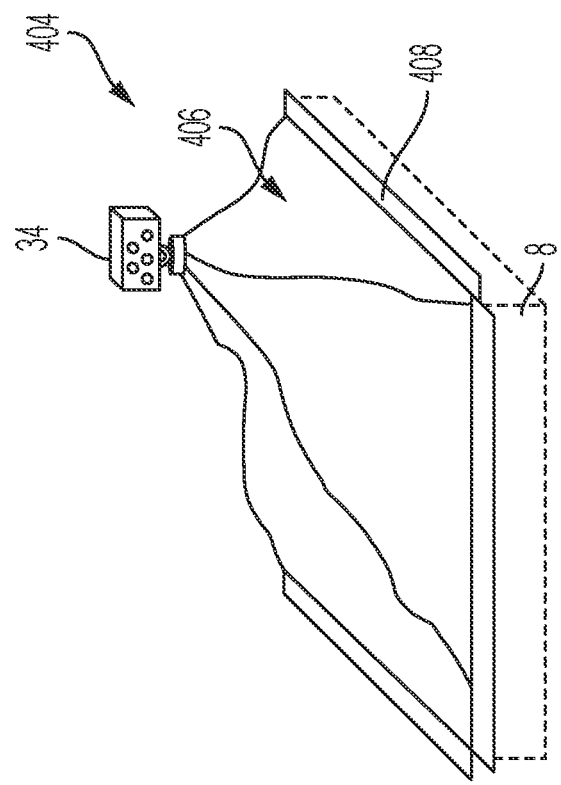
FIGS. 10A and 10B are outline views of another embodiment for a protection system against accumulation of debris within portions of a vehicle charging system, shown in two positions, in accordance with the disclosure.
Figure 10A:
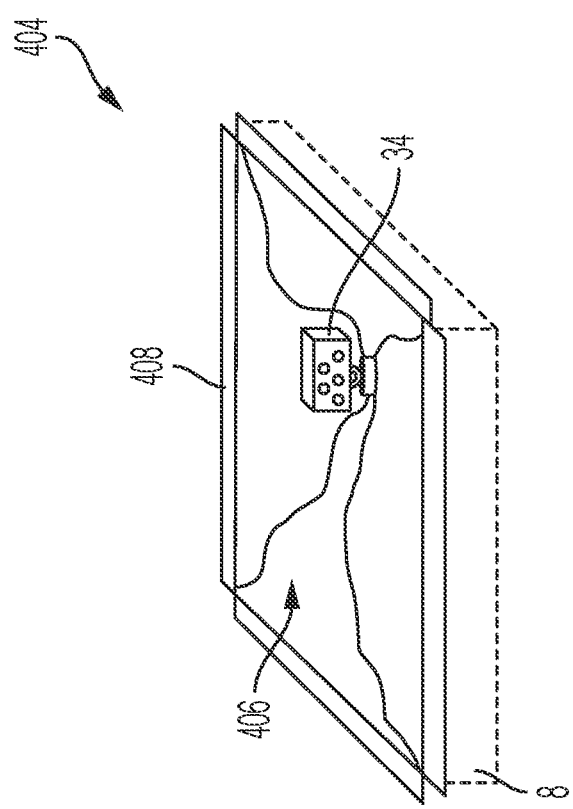

A second embodiment for a passive protection arrangement 404 is shown in FIGS. 10A and 10B. In this embodiment, similar to the embodiment shown in FIG. 9, the recess in the floor unit 8 contains the linkage 36 and connector 34. A weather tight jacket 406 is connected along a perimeter 408 of the recess and is also connected around the linkage 36 adjacent the connector 34. The jacket 406 thus flexibly encloses everything but the connector 34 to prevent contaminants from entering into the recess 9. As can be appreciated, the jacket 406 can be used in conjunction with the door 400, or separately.

Figure 11B:
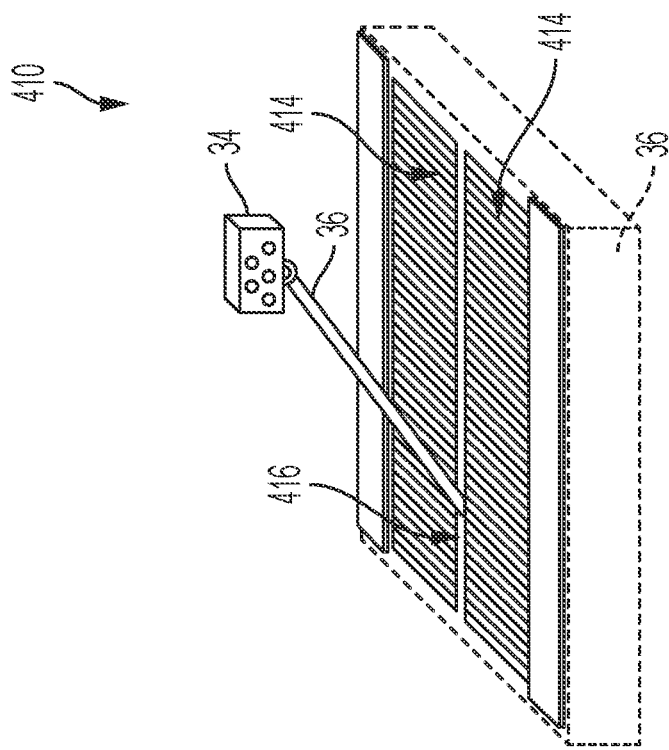
FIGS. 11A and 11B are outline views of another embodiment for a protection and cleaning system for a vehicle charging system in accordance with the disclosure.
Figure 11A:
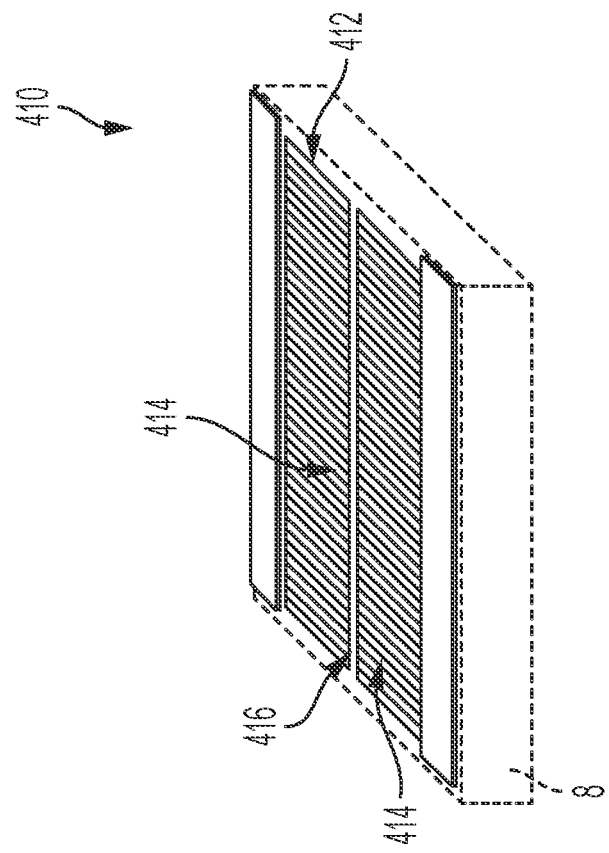

A third embodiment, which in this case is for a passive cleaning and protection system 410, is shown in FIGS. 11A and 11B. In this case, an opening 412 of the floor unit 8 that surrounds the recess 9 is covered by two semi-seal sheets 414 that meet along a middle seam 416. The sheets 414 may be made from flat brushes having semi-rigid bristles, or a type of stiff yet pliable sheet such as silicone, which deforms to allow the connector 34 to pass through the seam 416 but that also scrubs the sides of the connector 34 each time the connector passes through the seam 416. In the case of brushes, the cleaning of the connector faces is a sweeping action, while in the case of a sheet, the cleaning is more of a wiping action. In this arrangement, the sheets 414 protect the interior of the floor unit 8 from falling debris while also actively cleaning the connector 34 every time the linkage 36 deploys or retracts.

A fourth active cleaning and protection system 418 is shown in FIGS. 12A-12D. In this embodiment, a cleaning head 420 includes a plurality of cleaning brushes 422 that are arranged on the cleaning head 420 to match the pattern of sockets 424 in the connector 34. The cleaning head 420 is disposed within the recess 9 of the floor unit 8 and in a location where it can contact the connector 34 when in the stowed position, as shown in FIG. 12A. In this embodiment, following a cleaning operation, the linkage 36 brings the connector 34 in close proximity with the cleaning head 420 such that the sockets 424 are aligned with the cleaning brushes 422, as shown in FIG. 12B. Each cleaning brush 422 includes a shaft 426 and a cleaning head 428.

The shaft 426 is sized to substantially fill an empty space within each socket 424. For example, in the illustrated embodiment, the shaft 426 has a cylindrical shape with an outer diameter that fits within the sockets 424 with a clearance fit, and a length that exceeds the length of the sockets such that the shaft can extend clear through the sockets. To initiate a cleaning operation, actuators move the cleaning head 420 towards the connector 34 or, alternatively, the connector 34 is pushed towards the cleaning head 420 by the linkage 36. Actuators may also optionally impart a spinning motion to the cleaning heads 428. Upon continued motion of the cleaning brushes 422 into the sockets 424, the spinning (or stationary) cleaning heads 428 traverse the entire length of each socket 424, thus removing any dirt or debris having accumulated therein, and exit the sockets 442 from their opposite end, as shown in FIG. 12D. In this position, the shafts 426 occupy and protect the socket interiors 424 from further contamination. When a charging operation is to start, the process is repeated in reverse to free the connector 34 from the shafts 426.

A fifth active cleaning system 430 is shown in FIGS. 13A and 13B from different perspectives. The cleaning system 430 includes a manually or automatically driven high-pressure washer cart 430 that includes a lower cleaning head 436 and an upper cleaning head 438 attached to a frame 432 that moves transversely relative to the vehicle on rollers 434. As can be seen from the illustrations, the cart 430 is sufficiently low and operates within a ground clearance height of the vehicle such that the upper cleaning head 438 can spray air, water, a cleaning solution and/or a combination of such cleaning agents across and over the vehicle unit 16. Similarly, the lower cleaning head 438 traverses over and cleans the floor unit 8 and its contents. The cart 430, or an equivalent cleaning mechanism such as two cleaning heads attached to a cantilevered arm suspended in the ground clearance height of the vehicle, may be used on a regular basis and can also be integrated with a commercial car-washing booth offered as an option to customers.

Various embodiments disclosed herein are to be taken in the illustrative and explanatory sense, and should in no way be construed as limiting of the present disclosure. As used herein, the term cleaning in the context of the disclosure describes passive and active measures for removing debris from various surfaces of the systems described, and also protecting the various structures from debris accumulation, for example, by enclosing them at least partially such that debris may not generally accumulate thereon.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A protective arrangement for an electric vehicle charging system, comprising:
   a floor unit forming a recess;
   a linkage comprising at least one arm configured to raise an electrical connector for charging an electric vehicle and at least one actuator operably connected to the at least one arm, the linkage being configured to rotate the at least one arm around at least a first and a second axis, the first axis being essentially parallel to a direction of motion of an end of the at least one arm operably connected to one of the at least one actuators, the second axis being essentially perpendicular to the first axis and passing through a point of operable connection between the one actuator and the end of the at least one arm, the linkage being disposed in the recess and extendable from the recess from a stowed position to an extended position; and
   a cleaning device disposed to discourage accumulation of debris into the recess and on the linkage when the linkage is in the stowed position,
   wherein the cleaning device comprises at least one member from a group consisting of:
      a brush;
      a door slidably disposed on the floor, the door operating between a closed position in which the door encloses the recess and an open position;
      a jacket, the jacket being connected along a perimeter of the recess and also along a location along the linkage, the jacket being flexible to permit motion of the linkage and to flexibly enclose the recess and at least a portion of the linkage;

two semi-seal sheets disposed on opposite sides of the recess and extending over the recess to enclose the recess, wherein the two semi-seal sheets meet along a seam; and a cart being moveable along the floor, the cart having at least one cleaning head disposed to dispense a cleaning fluid to clean the recess and the linkage.

2. The protective arrangement of claim 1, wherein the cleaning device comprises the door slidably disposed on the floor and operating between a closed position in which the door encloses the recess and an open position, the protective arrangement further comprising an actuator operating to move the door between the open and closed positions, the actuator being responsive to a command signal to open or close the door.

3. The protective arrangement of claim 1, further comprising a connector disposed at an end of the linkage, the connector having sockets formed therethrough along opposite faces.

4. The protective arrangement of claim 3, wherein the cleaning device comprises the two semi-seal sheets, and wherein the two semi-seal sheets are made from flat brushes having semi-rigid bristles, the semi-rigid bristles brushing to clean the opposite faces of the connector as the linkage moves to and from the stowed position.

5. The protective arrangement of claim 3, wherein the cleaning device comprises the two semi-seal sheets, and wherein the two semi-seal sheets are made from stiff yet pliable sheets that deform to allow the connector to pass through the seam when the linkage moves to and from the stowed position, wherein the two sheets wipe to clean the opposite faces of the connector as the linkage moves to and from the stowed position.

6. The protective arrangement of claim 1, wherein the cleaning fluid is air, water, a cleaning solution, or a combination thereof.

7. A method for protecting a charging arrangement for an electric vehicle, comprising:

providing a floor unit forming a recess;

providing a linkage comprising at least one arm configured to raise an electrical connector for charging an electric vehicle and at least one actuator operably connected to the at least one arm, the linkage being configured to rotate the at least one arm around at least a first and a second axis, the first axis being essentially parallel to a direction of motion of an end of the at least one arm operably connected to one of the at least one actuators, the second axis being essentially perpendicular to the first axis and passing through a point of operable connection between the one actuator and the end of the at least one arm, the linkage being disposed in the recess and extendable from the recess from a stowed position to an extended position; and providing a cleaning device disposed to discourage accumulation of debris within the recess and onto the linkage when the linkage is in the stowed position.

8. The method of claim 7, wherein the cleaning device is a door slidably disposed on the floor, the door operating between a closed position in which the door encloses the recess and an open position, and discouraging accumulation of debris is accomplished by placing the door in the closed position.

9. The method of claim 7, wherein the cleaning device includes a jacket, the jacket being connected along a perimeter of the recess and also along a location along the linkage, the jacket being flexible to permit motion of the linkage and to flexibly enclose the recess and at least a portion of the linkage, wherein discouraging accumulation of debris is accomplished by collecting debris on an exterior of the jacket.

10. The method of claim 7, further comprising providing a connector disposed at an end of the linkage, the connector having sockets formed therethrough along opposite faces.

11. The method of claim 7, wherein the cleaning device includes two semi-seal sheets disposed on opposite sides of the recess, extending towards one another to meet along a seam, and extending over the recess to enclose the recess.

12. The method of claim 11, wherein discouraging accumulation of debris is accomplished by sweeping or brushing debris from the connector and any exposed portions of the linkage as the linkage moves to and from the stowed position through the seam while contacting the seam.

13. The method of claim 11, wherein the two semi-seal sheets are made from flat brushes having semi-rigid bristles, the semi-rigid bristles brushing to clean the opposite faces of the connector as the linkage moves to and from the stowed position through the seam.

\* \* \* \* \*